United States Patent [19]

Horiie et al.

[11] 3,872,068

[45] Mar. 18, 1975

[54] PROCESS FOR PREPARING BLOCK COPOLYMER RESIN

[75] Inventors: Shigeki Horiie, Yokohama; Susumu Kurematsu, Zama; Shin-ichiro Asai, Machida, all of Japan

[73] Assignee: Denki Kagaku Kogyo K.K., Tokyo, Japan

[22] Filed: May 4, 1973

[21] Appl. No.: 357,170

Related U.S. Application Data

[63] Continuation of Ser. No. 134,391, April 15, 1971, abandoned.

[30] Foreign Application Priority Data

Apr. 24, 1970 Japan................................ 45-034737

[52] U.S. Cl. ............................ 260/83.7, 260/880 B
[51] Int. Cl. ........................... C08f 19/08, C08f 1/28
[58] Field of Search .......... 260/880 B, 94.2 M, 83.7

[56] References Cited
UNITED STATES PATENTS

| | | |
|---|---|---|
| 3,078,254 | 2/1963 | Zelinski et al. ..................... 260/880 |
| 3,157,604 | 11/1964 | Strobel et al. .................. 260/94.2 M |
| 3,251,905 | 5/1966 | Zelinski .............................. 260/880 |
| 3,287,333 | 11/1966 | Zelinski .............................. 260/880 |
| 3,377,404 | 4/1968 | Zelinski ............................ 260/94.2 |

Primary Examiner—John C. Bleutge
Attorney, Agent, or Firm—Oblon, Fisher, Spivak, McClelland & Maier

[57] ABSTRACT

An impact resistant block copolymer prepared by polymerizing a mixture of a vinyl substituted aromatic hydrocarbon and a conjugated diene in a non-polar solvent wherein said polymerization is initiated with an initiator prepared by reacting lithium with a non-condensed type polycyclic aromatic hydrocarbon, so as to form a block copolymer having a middle portion of an elastomeric tapered copolymer of a conjugated diene and a minor amount of a vinyl substituted aromatic hydrocarbon, which is chain terminated on both ends with blocks of a polymerized vinyl substituted aromatic hydrocarbon.

7 Claims, No Drawings

3,872,068

PROCESS FOR PREPARING BLOCK COPOLYMER RESIN

This is a continuation, division, of application Ser. No. 134,391 filed April 15, 1971.

BACKGROUND OF THE INVENTION

1. Field of the Invention

This invention relates to a process for preparing block copolymers having excellent mechanical properties, especially high impact resistance. More particularly, this invention relates to a one stage process for preparing a block copolymer by polymerizing a vinyl substituted aromatic hydrocarbon with a conjugated diene, in the presence of an initiator which is the reaction product of lithium and a non-condensed type polycyclic aromatic hydrocarbon.

2. Description of the Prior Art

It is known that various types of block copolymers can be prepared using an alkali metal or an organic alkali metal compound as an intiator. However, in order to obtain clear thermoplastic resins having excellent physical properties particularly excellent impact resistance, it has been required to form a 3-block structure in which an elastomeric block of a conjugated diene is end terminated with non-elastomeric blocks of vinyl-substituted aromatic hydrocarbon. Preferably the blocks should have a high difference in glass transition points (Tg) and good results have been achieved when the glass transition point of the non-elastomeric block (Tg) is more than 100°C and that of elastomeric block (Tg) is less than −40°C.

When the alkali metal initiator is other than lithium, or when the polymerization is conducted in a polar solvent, even though lithium is used, the content of the vinyl bonds in the resultant polybutadiene block was increased, and accordingly the glass transition point (Tg) was increased, thereby decreasing the mechanical strength and plastic elasticity of the resin, and adversely affecting the low temperature physical properties of the resin.

Various processes for preparing block copolymers, have been reported, although most conventional processes are directed mainly toward preparing self vulcanizable elastomers. For example, in Japanese patent publication No. 23798/1965, there is disclosed a non-elastomeric block, made of an unsaturated compound, e.g., vinyl substituted aromatic compound bonded to an elastomeric block, made primarily of a conjugated diene, bonded to the non-elastomeric block. That block was prepared by a multi-stage "living" polymerization method using a lithium compound as an initiator.

In Japanese patent publication No. 19286/1961; it has been disclosed that a block copolymer having a middle, elastomeric block and terminal non-elastomeric blocks, can be prepared in multi-stages using an aromatic compound having two lithium atoms as the initiator.

However, in said multi-stage polymerization method, the rate of formation of the undesirable homopolymer, or 2-block copolymer, is significantly increased, since the rate of formation of inert terminals are gradually increased due to impurities in the solvent or in the monomers in each stage.

The admixture of said homopolymer and 2-block copolymer with the desired 3-block copolymers product usually adversely affects the mechanical properties of the block copolymer as an elastic polymer. The admixture of the 2-block copolymer with the 3-block copolymer, will itself remarkably decrease clarity, elongation, yield strength and most importantly, impact strength.

These disadvantages cannot be avoided in the multistage polymerization method.

SUMMARY OF THE INVENTION

Accordingly, it is one object of this invention to provide a process for preparing block copolymers having excellent mechanical properties, particularly good impact resistance, high yield strength, and excellent clarity.

It is another object of this invention to provide a one stage polymerization, process for preparing a 3-block copolymer, having a middle tapered elastomeric block, which process yields less homopolymer and/or less 2-block copolymer, as compared with conventional processes.

It is a further object of this invention to provide a process for preparing a block copolymer by copolymerizing a vinyl substituted aromatic hydrocarbon with a conjugated diene by end terminal "living" polymerization, in one stage, in the presence of a di-anion produced by adding an initiator to a non-polar solvent.

These and other objects have now herein been attained by the end terminal "living" polymerization of a mixture of a vinyl substituted aromatic hydrocarbon and a conjugated diene with a di-anion formed by the reaction of a polar solvent and an initiator. According to this process the conjugated diene is first selectively polymerized before the vinyl substituted aromatic hydrocarbon because of the difference in reaction velocities of the comonomer in the non-polar solvent. The conjugated diene is first polymerized with a small amount of vinyl substituted aromatic hydrocarbon and then the rate of polymerization of the vinyl substituted aromatic hydrocarbon to the conjugated diene is gradually increased. After polymerizing all of the conjugated diene with a small amount of the vinyl substituted aromatic hydrocarbon, polymerization of the vinyl substituted aromatic hydrocarbon is initiated to yield a homopolymer block.

The structure of the 3-block copolymer obtained by this invention is composed of terminal groups of a vinyl substituted aromatic hydrocarbon homopolymer block with a conjugated diene rich center, which is tapered in the same ratio as the total conjugated diene to vinyl substituted aromatic hydrocarbon.

Accordingly, the resultant block copolymer of this invention is characterized by exceptionally good elongation and high impact resistance, as compared with conventional 3-block copolymers of the vinyl aromatic-conjugated diene block-vinyl aromatic block form.

DESCRIPTION OF EMBODIMENT

In accordance with this invention, a one stage "living" polymerization process is provided for preparing a block copolymer having the form: (non-elastomeric block of a vinyl substituted aromatic hydrocarbon)-(elastomeric block of a predominant amount of conjugated tapered diene)-(said non-elastomeric block). Polymerization of a vinyl substituted aromatic hydrocarbon and a conjugated diene is effected in a non-polar solvent in the presence of the reaction product of lithium and a non-condensed type polycyclic aromatic hydrocarbon. The block copolymer of this invention is formed by the difference in reaction velocities between the vinyl substituted aromatic hydrocarbon and the conjugated diene.

Although is has been known to use di-lithium adducts, i.e., organic di-lithium compounds as initiators for preparing 3-block copolymers, such conventional organic di-lithiums have, in general, shown a quite poor solubility in non-polar solvents, e.g., hydrocarbons and therefore formed a heterogeneous catalyst system which resulted in low initiation polymerization efficiency. The desired homogeneous initiator used in the process of this invention is prepared by complexing lithium with a non-condensed type polycyclic aromatic hydrocarbon in a polar medium, particularly cyclic ethers and aliphatic polyethers. A small amount of conjugated diene may then be added to yield a di-anion of hydrocarbon oligomer. The polar medium is then substituted by a non-polar solvent by distillation of the polar medium and by the addition of a non-polar solvent.

It has been disclosed in Japanese patent publication No. 11,090/1964, that the reaction product of lithium and a condensed type aromatic compound in a polar solvent, may be used as an initiator. Also, it has been disclosed in Japanese patent application No. 26,592/1963, that the reaction product of lithium and certain accelerants, such as a conducted aromatic hydrocarbon in an aliphatic monoether medium, may be used as initiators.

However, the initiator used in the process of this invention has a significantly higher activity than any of these previously known initiators.

Suitable non-condensed type polycyclic aromatic hydrocarbons used for the preparation of the initiator, include biphenyl and terphenyl hydrocarbons. Not included, however are the condensed aromatic hydrocarbons, such as naphthalene, anthracene, phenanthrene and alkyl derivatives thereof.

In preparing the initiator, at least 1 gram atom of lithium is reacted with 1 mole of said non-condensed type aromatic hydrocarbon. It is not preferable to use less than 1 gram atom of lithium per mole of non-condensed type aromatic hydrocarbon, because the resultant initiator, will be characterized by reduced activity. On the contrary, it is not preferable to use a substantial excess of lithium, since it would be inefficient and uneconomical. Suitably lithium is used in the range of 1–10 gram atom of lithium per mole of non-condensed type aromatic hydrocarbon.

The initiator formation reaction temperature should in general be between −78°C and 30°C. preferably between −40°C and 0°C. Above 30°C. polymerization of the conjugated diene will occur. The particular reaction period however can be easily selected depending upon the reaction temperature.

Suitable polar solvents used for the preparation of the initiator include the cyclic ethers, such as tetrahydrofuran and tetrahydropyran; and the aliphatic polyethers such as ethylene glycol diethyl ether, ethylene glycol dimethylether, diethylene glycol dimethylether.

It is not preferable to use an aliphatic monoether, because of its fairly slow reaction velocity. On the contrary, when an aliphatic polyether or cyclic is used, the reaction velocity is remarkably high and the ratio of the non-condensed type aromatic hydrocarbon to lithium can be decreased thereby increasing the purity of the finished product.

The quantity of polar solvent is not critical, however, it is necessary to remove the polar medium after the reaction of the lithium with the non-condensed type aromatic hydrocarbon, and to substitute a non-polar solvent, such as a hydrocarbon. If the polar medium remains in the initiator and is mixed with the monomers, in an amount of more than 2 percent by weight, only a random copolymer of the monomeric will result, and it is impossible to obtain a block copolymer having the desired excellent mechanical properties and clarity.

Suitable vinyl substituted aromatic hydrocarbons used for this invention, include styrene, α-methyl styrene, p-methyl styrene, 3,5-diethyl styrene, 4-n-propyl styrene, 2,4,6-trimethyl styrene, 4-n-propyl styrene, 2,4,6-trimethyl styrene and 3-methyl 5-n-hexyl styrene.

Suitable conjugated dienes used for this invention, include 1,3-butadiene, and isoprene. In the process of this invention, it is preferable to use styrene in amounts of from 60 to 95 percent, and especially from 75 to 85 percent by weight of total monomers, with the remainder being the conjugated dienes.

Suitable inactive hydrocarbon solvents used for this process include aromatic hydrocarbons, such as benzene, toluene, xylene and ethylbenzene; aliphatic hydrocarbons, such as n-hexane, cyclohexane, and mixtures thereof.

It is preferable to remove any impurities in the initiator or the monomers prior to use, such as moisture, oxygen, carbon dioxide, certain sulfur compounds or acetylene.

The block copolymerization of styrene and conjugated diene may be carried out at about −20°C −100°C. preferably at between about 20°C–65°C. The reaction period will depend upon the polymerization conditions. Good results have been obtained within 48 hours and preferably up to 24 hours.

In one aspect of the present one stage block copolymerization the conjugated diene is first polymerized with a small amount of styrene to yield an elastomeric tapered copolymer block of the conjugated diene and styrene. Styrene is polymerized on the ends of said block to make a styrene homopolymer block. In the tapered copolymer block, the ratio of the conjugated diene is quite rich in its center.

After the block copolymerization, the initiator and active terminals are inactivated with methanol or isopropyl alcohol. Further, a small amount of an antioxidant, such as 4-hydroxymethyl-2,6-di-butyl phenol is added. The resultant block copolymer is precipitated by adding an excess of methanol or isopropyl alcohol, and then is filtered and dried.

As stated above, the process of this invention is to prepare a block copolymer resin having excellent impact resistance by polymerizing a conjugated diene and a vinyl aromatic compound, in a one stage reaction, in the presence of an initiator prepared by reacting lithium and a non-condensed type polycyclic aromatic hydrocarbon, in a polar medium of a cyclic ether or aliphatic polyether. A small amount of a diene is added to complex therewith and to convert it to a di-anion of diene-oligomer.

The resultant block copolymer has excellent mechanical properties including high yield strength, good tensile strength, and good elongation, which is suitable for various resin applications.

These advantages of the mechanical properties of the resultant block copolymer are provided by the novel structure of the 3-block copolymer having the tapered center region.

Having generally described the invention, a further understanding can be obtained by reference to certain specific examples which are provided herein for purposes of illustration only and not intended to be limiting in any manner unless otherwise specified.

EXAMPLE 1

In a 1 liter flask equipped with a sealed stirrer, reflux condenser, gas inlet, reactant inlet, funnel and thermometer, 250 ml of ethylene glycol dimethylether was added and 7.7g of diphenyl was dissolved in it, and then the flask was filled with argon gas. 1.7g of lithium, which is dispersed in solid paraffin at the rate of 30 percent by weight, was added to the flask to prepare a deep green color, complex solution.

The flask was placed in a dry ice-methanol bath to cool the contents to less than −40°C and then 50g of butadiene was slowly charged. Butadiene was charged so slowly that the deep green color of the content was not changed to a reddish-brown color. After charging butadiene for 1 hour the reaction product was allowed to stand at room temperature, thereby permitting the color of the reaction product to change to a reddish-brown color.

The reaction product was heated at the boiling point of the solvent and was refluxed for several minutes, and then the solvent was distilled out and the product was dried in vacuum. After sufficient drying, 300 ml of benzene was added and distilled again to dry the product.

400 ml of dried benzene was further added to the product and the solution was filtered to obtain 500 ml of a reddish-brown solution.

The product was titrated with 0.1 N HCl in methanol-water with a phenolphthalein indicator to 0.36 N/l concentration.

30 ml of said catalyst solution was charged into an autoclave equipped with stirrer which was maintained at 50°C. in which 1.5l of dehydrated and deaerated benzene, 400g of styrene and 100g of butadiene were previously placed.

The color of the mixture was changed to reddish-brown at the charge of said catalyst solution, and was further changed to yellow at the decrease of butadiene.

The pressure of butadiene at the initiation was about 0.5kg/cm$^2$ and was decreased to atmospheric pressure about 20 minutes later. About 30 minutes later, the color of the reaction solution was changed to red, and the styrene polymerization increased the temperature by the exothermic reaction. After about 1 hour after the initiation, the viscous reddish solution was admixed with several milliliters of a mixture of benzene and methanol to yield a colorless clear solution having a viscosity decreased from about 5,000cp. to about 1,500cp at 50°C.

The product was precipitated in methanol and dried in vacuum to yield 495g of block copolymer.

The molecular weight of the resultant block copolymer determined by osmotic pressure method is toluene, was 125,000.

The styrene content measured by refractive index method was 79 percent by weight.

EXAMPLE 2

The block copolymerization procedure of Example 1 was repeated except 50 ml of the reaction product solution was periodically withdrawn. Each sample was treated with a small amount of the benzene-methanol mixture. The viscosity, the extent of precipitation in methanol, and the yield were measured. The results are shown in Table 1.

TABLE I

| Period of Reaction minutes | Viscosity (*1) (CP) | Conversion (*2) (%) | Styrene content in (*3) Polymer |
|---|---|---|---|
| 10 | 190 | 11 | 30 |
| 20 | 340 | 19 | 34 |
| 30 | 500 | 25 | 37 |
| 40 | 1500 | 99 | 79 |
| 50 | 1450 | 98 | 81 |

*1 50 ml of reaction product was treated with 3 ml of benzene-methanol mixture of 4:1 by volume.
The sample was measured by Emiller viscometer at 50°C
*2 10 ml of reaction product was dried in vacuum on aluminum foil.
*3 The reaction product dried in vacuum was dissolved in CS$_2$ and the solution was dried by air-blower on Abbe refractometer. The styrene content was determined by refractive index thereof.

EXAMPLE 3

The block copolymerization processes of Example 1 were repeated except each total amount of styrene and butadiene was 500g. and the rate of styrene to butadiene were respectively selected in the range of 70/30 – 90/10.

The various properties of resultant block copolymers are shown in Table II.

TABLE II

| | | | | | | |
|---|---|---|---|---|---|---|
| Charged styrene/butadiene ratio by weight | 65/35 | 70/30 | 75/25 | 80/20 | 85/15 | 90/10 |
| Block copolymer styrene/butadiene ratio by weight (*1) | 63.5/36.5 | 71.5/28.5 | 74/26 | 78/22 | 86.5/13.5 | 93/7 |
| Molecular weight (×10$^4$) (*2) | 10.1 | 10.6 | 10.8 | 11.0 | 12.1 | 11.0 |

TABLE II—Continued

| | | | | | | |
|---|---|---|---|---|---|---|
| Tensile strength (kg/cm) (*3) | 185 | 187 | 198 | 217 | 305 | 385 |
| Elongation (%) (*3) | 350 | 275 | 172 | 126 | 104 | 67 |
| Dynstat Impact strength (kg cm/cm$^2$) (*4) | — | — | — | 130 | 110 | 26 |
| Rockwell (M scale ¼) hardness (*5) | — | — | 7 | 11.0 | 24.5 | 32.5 |
| Cloudiness (%) (*6) | 21.0 | 17.0 | 15.0 | 11.0 | 6.8 | 4.6 |

(*1) The block copolymer was dissolved in CS$_2$ and was dried by air-blower on Abbe refractometer. The ratio of styrene to butadiene was determined by refractive index thereof.
(*2) It was determined by osmotic pressure method in toluene.
(*3) It was used dumbbell of 2 mm in thickness 10 mm in width and 80 mm in length.
(*4) DIN dynestatt impact strength of sample of 2 mm in thickness and 10 mm in width, was measured.
(*5) ASTM D-785 was applied.
(*6) ASTM D-100 was applied.

EXAMPLE 4

11.5g of o-terphenyl and 1.7g of lithium were reacted in 250 ml of tetrahydrofuran in accordance with Example 1. Then, butadiene was charged to the reaction product and the solvent of tetrahydrofuran was replaced with benzene to yield 500 ml of black-reddish brown reaction product. Titration of the product with HCl showed, 0.39 N/l of concentration.

In accordance with the process of Example 1, the block copolymerization of styrene and butadiene were repeated by using said catalyst solution, wherein each total amount of styrene and butadiene was 500g and the rate of styrene to butadiene was respectively in the range of 70/30 – 90/10.

The physical properties of resultant block copolymers are shown in Table III.

REFERENCE EXPERIMENT 1

In order to show the difference between the process of this invention and conventional block copolymerization, the following experiments were made for comparison purposes.

By using same catalyst solution of Example 1, butadiene and styrene were polymerized in two stages, wherein firstly only butadiene was polymerized and after the pressure of butadiene disappeared, the flask was deacrated and 0.1 ml of sec-butyl lithium in 1 l of benzene was charged and then styrene was charged.

The monomer recipes stated in Examples 3 and 4 were employed. The results of said experiments are shown in Table IV.

TABLE III

| | | | | | | |
|---|---|---|---|---|---|---|
| Charged styrene/butadiene ratio by weight | 65/35 | 70/30 | 75/25 | 80/20 | 85/15 | 90/10 |
| Block copolymer styrene/butadiene ratio by weight | 64.5/35.5 | 69/31 | 74.5/25.5 | 80/20 | 85/15 | 89/11 |
| Molecular weight (×10$^4$) | 10.5 | 9.9 | 11.1 | 9.5 | 8.9 | 10.0 |
| Tensile strength (Kg/cm) | 175 | 200 | 225 | 197 | 282 | 370 |
| Elongation (%) | 385 | 272 | 170 | 102 | 94 | 40 |
| Dynstat Impact strength (kg m/cm$^2$) | — | — | — | 104 | 64.5 | 20 |
| Rockwell (M scale ¼) hardness | — | — | — | 8 | 21 | 39 |
| Cloudness (%) | 23.0 | 18.0 | 17.0 | 12.6 | 5.0 | 4.5 |

TABLE IV

| | | | | | | |
|---|---|---|---|---|---|---|
| Charged styrene/butadiene ratio by weight | 65/35 | 70/30 | 75/25 | 80/20 | 85/15 | 90/10 |
| Block polymer styrene/butadiene ratio by weight | 62.5/37.5 | 71.5/28.5 | 74.5/25.5 | 87/13 | 86.5/13.5 | 91/9 |
| Molecular weight (× 10$^4$) | 11.7 | 12.1 | 10.1 | 13.1 | 12.6 | 11.0 |

TABLE IV—Continued

| | | | | | | |
|---|---|---|---|---|---|---|
| Tensile strength (kg/cm) | 198 | 201 | 250 | 272 | 321 | 405 |
| Elongation (%) | 170 | 52.1 | 25.5 | 12.5 | 10 | 7 |
| Dynstat Impact strength (kg m/cm$^2$) | 70 | 35 | 32.5 | 21.0 | 11.5 | 12 |
| Rockwell (M scale ¼) hardness | 7 | 22 | 25 | 27 | 31 | 41 |
| Cloudiness (%) | 22.0 | 17.0 | 12.5 | 11.0 | 5.0 | 4.5 |

It was shown that the block copolymers prepared by said reference experient, in two stages, were respectively inferior to those of this invention in one stage, in comparison of impact strength and elongation thereof.

EXAMPLE 5

A 3 liter flask equipped with a sealed stirrer, reflux condenser gas inlet, reactant inlet, funnel and thermometer, was charged with 300 ml of tetrahydrofuran which was distilled after refluxing on a sodium-potassium alloy. 1 g of diphenyl was recrystallized in hexane and was dried, and was dissolved in said tetrahydrofuran, and 1 ml of styrene was added.

30 l of argon gas was passed through a titanium sponge layer heated at 800°C and a molecular sieve, for dehydration, was charged to said flask over a period of 30 minutes. About 0.3 m mole of sec-butyl lithium was added to the contents to yield a pale yellow solution and 10 l of argon gas was charged over a period of 10 minutes. 70 mg of lithium dispersed in solid paraffin in a concentration of 30 percent by weight, was added over a period of 2–3 minutes to the contents to turn the solution green.

The flask was placed in a dry ice-methanol bath to cool the contents and then 3 ml of isoprene was added to the contents and stirred for 30 minutes. The flask was removed from said dry ice-methanol bath and placed into a water bath at 30°C. The tetrahydrofuran was removed by vacuum. 300 ml of benzene which was deaerated by argon and dehydrated by sec-butyl lithium with indicator of styrene, was charged and then the benzene was removed by vacuum distillation, 1.5 l of benzene and 400 g of styrene which were deaerated and dehydrated by said procedure, were, respectively charged together with 100 g of isoprene distilled on sodium, in the flask. The contents was pale yellow reddish brown in color.

While stirring, the viscosity of the contents was gradually increased by the reaction. After about 50 minutes, the color was turned to red and the polymerization of the styrene was initiated. The temperature was raised to 70°C – 80°C and after 10 minutes a lot of bubbles were observed. After about 1.5 hours following the initiation of the polymerization, a small amount of methanol-benzene mixture was added and the reaction product was precipitated with methanol and was dried in vacuum.

1 % of 4-hydroxymethyl -2,6-di-t-butyl phenol was added to the dried polymer, which was pelletized by an extruder. The resultant pellet was formed into a dumbell shape of 2 mm in thickness, 10 mm in width and 8 mm in length, by injection molding. The physical properties of the resultant product are shown in Table V.

TABLE V

| | |
|---|---|
| Charged styrene/isoprene ratio by weight | 80/20 |
| Molecular weight (× 10$^4$) | 8.9 |
| Tensile strength (kg/cm$^2$) | 1370 |
| Elongation (%) | 37 |
| Dynstat impact strength (kg cm/cm$^2$) | 25 |
| Rockwell hardness (M scale ¼) | 31 |
| Cloudiness (%) | 7.5 |

EXAMPLE 6

1 g of p-phenyl and 100 mg of lithium were reacted in tetrahydrofuran by the process of Example 5.

5 g of butadiene was charged and then the tetrahydrofuran was distill out and was replaced with benzene. 1.5 l of benzene, 425 g of styrene and 75 g of butadiene were added and polymerized at 50°C. Following the polymerization of butadiene with a small amount of styrene, after 35 minutes, the polymerization of styrene was initiated to raise the temperature of the contents in the flask to 100°C.

After the polymerization, the block copolymer was separated to yield 495 g. and the molecular weight determined by osmotic pressure method in toluene, was found to be about 125,000.

1 % of 4-hydroxymethyl-2,6-di-t-butyl phenol was added to the block copolymer which was pelletized by an extruder.

The resultant pellet was formed into a dumbbell shape of 2 mm in thickness, 10 mm in width and 80 mm in length by injection molding. The physical properties of the resultant products are shown in Table VI.

TABLE VI

| | |
|---|---|
| Charged styrene/butadiene ratio by weight | 85/15 |
| Molecular weight (× 10$^4$) | 12.5 |
| Tensile strength (kg/cm$^2$) | 320 |
| Elongation (%) | 70 |
| Dynstat impact strength (kg cm/cm$^2$) | 107 |
| Rockwell hardness (M scale ¼) | 23 |
| Cloudiness (%) | 7.0 |

EXAMPLE 7

10 g of diphenyl and 2.5 g of lithium were reacted in 250 ml of tetrahydrofuran by the process of Example 1.

80 g of butadiene was charged and then the tetrahydrofuran was replaced with benzene to obtain 600 ml of a black-reddish-brown reaction product solution.

Titration of the product with HCl showed 0.45 N/$l$ of concentration.

In accordance with the process of Example 1. 400 g of styrene and 100 g of isoprene were reacted in benzene at 35°C by using 20 ml of said catalyst solution.

After 40 minutes, the contents were turned to red and the polymerization of styrene was initiated at about 100°C. After the reaction, the resultant copolymer was precipitated in methanol and was dried in vacuum. 1% of 4-hydroxy-methyl-2.6-di-t-butyl phenol was added to the resultant copolymer, which was pelletized by an extruder. The resultant pellet was formed into a dumbbell shape of 2 mm in thickness 10 mm width and 80 mm in length by injection molding. The physical properties of the resultant products are shown in Table VII.

TABLE VII

| | |
|---|---|
| Charged styrene/isoprene ratio by weight | 80/20 |
| Molecular weight ($\times 10^4$) | 8.5 |
| Tensile strength (kg/cm$^2$) | 320 |
| Elongation (%) | 60 |
| Dynstat impact strength (kg cm/cm$^2$) | 35 |
| Rockwell hardness (M scale ¼) | 29 |
| Cloudiness (%) | 5.0 |

EXAMPLE 8

The polymerization processes of Examples were repeated except each total amount of styrene and isoprene was 500 g. and the rate of styrene to isoprene were respectively selected in the range of 70/30 – 90/10.

The various properties of resultant block copolymers are shown in Table VIII.

TABLE VIII

| Charged styrene/isoprene ratio by weight | 70/30 | 75/25 | 80/20 | 85/15 | 90/10 |
|---|---|---|---|---|---|
| Molecular weight ($\times 10^4$) | 10.1 | 9.5 | 7.9 | 9.0 | 8.5 |
| Tensile strength (kg/cm) | 280 | 290 | 330 | 370 | 420 |
| Elongation (%) | 105 | 70 | 50 | 35 | 21 |
| Dynstat Impact strength (kg cm/cm$^2$) | 68 | 41 | 33 | 31 | 15 |
| Rockwell hardness (M scale ¼) | 17 | 22 | 25 | 31 | 41 |
| Cloudiness (%) | 6.8 | 7.0 | 5.5 | 5.0 | 3.3 |

REFERENCE EXPERIMENT 2

In order to show the difference between the process of this invention and conventional block copolymerization, the following experiments were made as a comparative reference.

By using the same catalyst solution as in Example 7, isoprene and styrene were polymerized in two stages, wherein firstly only isoprene was polymerized at 50°C for 30 minutes and was cooled at 25°C. and then styrene was added and polymerized for 30 minutes, wherein the rate of styrene to isoprene was selected in the range of 70/30 – 90/10.

Each resultant copolymer which was treated and dried, was mixed with 1% of 4-hydroxymethyl-2.6-di-t-butyl phenol and shaped.

The physical properties of the resultant copolymers are shown in Table IX.

TABLE IX

| Charged styrene/isoprene ratio by weight | 70/30 | 75/25 | 80/20 | 85/15 | 90/10 |
|---|---|---|---|---|---|
| Molecular weight ($\times 10^4$) | 8.5 | 7.5 | 9.0 | 10.1 | 10.5 |
| Tensile strength (kg/cm$^2$) | 310 | 300 | 350 | 390 | 440 |
| Elongation (%) | 50 | 20 | 15 | 17 | 5 |
| Dynstat Impact strength (Kg cm/cm$^2$) | 22 | 25 | 18 | 19 | 15 |
| Rockwell hardness (M scale ¼) | 32 | 33 | 35 | 39 | 45 |
| Cloudiness (%) | 9.0 | 7.5 | 7.7 | 6.0 | 3.0 |

Having now fully described the invention, it will be apparent to one of ordinary skill in the art that many changes and modifications can be made thereto without departing from the spirit or scope thereof. Accordingly what is intended to be covered by Letters Patent is:

What we claim is:

1. A process for preparing an impact resistant block copolymer which comprises:

forming a complex of lithium metal and biphenyl or terphenyl in a solvent selected from the group consisting of tetrahydrofuran, tetrahydropyran, ethylene glycol diethyl ether, ethylene glycol dimethyl ether and diethylene glycol dimethyl ether at a temperature of −78°C to 30°C wherein 1 – 10 gram atom of lithium per mole of said biphenyl or terphenyl is used, reacting butadiene with said complex so as to prepare a aromatic hydrocarbon soluble butadiene oligomer dilithium, removing said solvent from said complex and contacting and polymerizing a vinyl substituted aromatic hydrocarbon and a conjugated diene in the presence of said complex, wherein said polymerization reaction is effected in an aromatic hydrocarbon solvent so as to form a block copolymer having a middle portion of an elastomeric tapered copolymer of a conjugated diene and a minor amount of a vinyl substituted aromatic hydrocarbon, which is chain terminated on both ends with blocks of a polymerized vinyl substituted aromatic hydrocarbon.

2. The process of claim 1, wherein at the completion of said reaction of lithium and aromatic hydrocarbon, the polar medium is replaced with a non-polar solvent to make a homogeneous initiator solution containing no polar medium.

3. The process of claim 1, wherein the vinyl substituted aromatic hydrocarbon is styrene.

4. The process of claim 1, wherein the conjugated diene is butadiene.

5. The process of claim 1, wherein the conjugated diene is isoprene.

6. The process of claim 1, wherein the rate of said vinyl substituted aromatic hydrocarbon to conjugated diene is 60:40 – 95:5 by weight.

7. The process of claim 1 wherein said solvent is tetrahydrofuran or tetrahydropyran.

* * * * *